Jan. 3, 1939.                    C. S. LAWTON                    2,142,135
    TELEMETRIC APPARATUS FOR DETERMINING THE TENSION ON AND ANGULAR
      DIRECTION OF SUBMARINE CABLES DURING CABLE LAYING OPERATIONS
              Filed Feb. 19, 1938              3 Sheets-Sheet 1
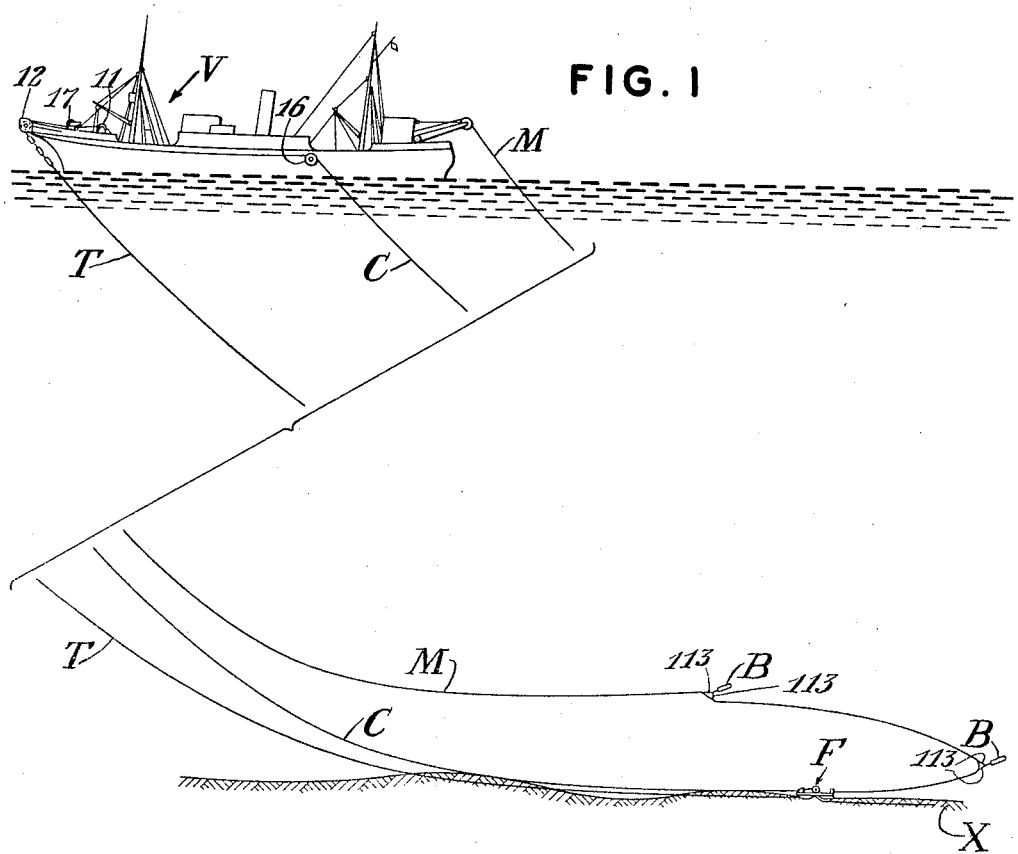
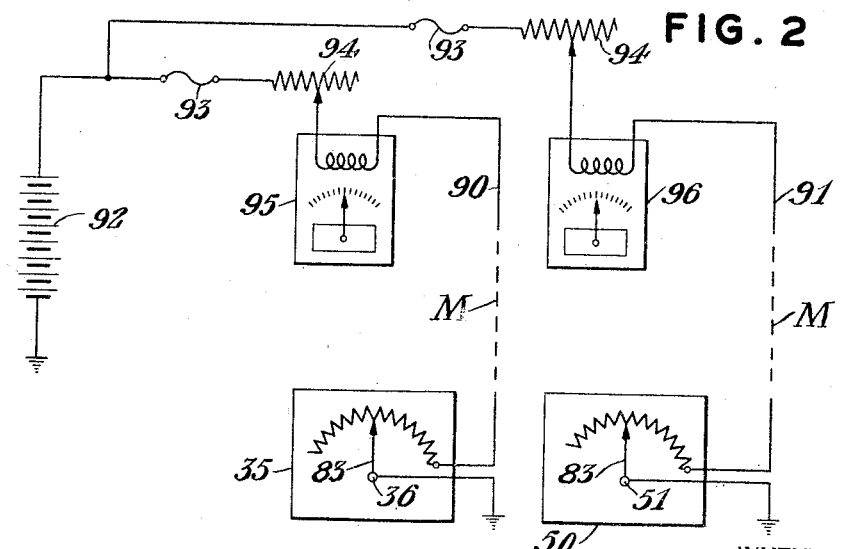
INVENTOR
C. S. LAWTON
BY
ATTORNEY Jan. 3, 1939.   C. S. LAWTON   2,142,135
TELEMETRIC APPARATUS FOR DETERMINING THE TENSION ON AND ANGULAR
DIRECTION OF SUBMARINE CABLES DURING CABLE LAYING OPERATIONS
Filed Feb. 19, 1938   3 Sheets-Sheet 2

INVENTOR
C. S. LAWTON
BY
ATTORNEY

Jan. 3, 1939.  C. S. LAWTON  2,142,135
TELEMETRIC APPARATUS FOR DETERMINING THE TENSION ON AND ANGULAR
DIRECTION OF SUBMARINE CABLES DURING CABLE LAYING OPERATIONS
Filed Feb. 19, 1938  3 Sheets-Sheet 3

INVENTOR
C. S. LAWTON
BY
ATTORNEY

Patented Jan. 3, 1939

2,142,135

UNITED STATES PATENT OFFICE 2,142,135

TELEMETRIC APPARATUS FOR DETERMINING THE TENSION ON AND ANGULAR DIRECTION OF SUBMARINE CABLES DURING CABLE LAYING OPERATIONS

Chester S. Lawton, Ridgewood, N. J., assignor to The Western Union Telegraph Company, New York, N. Y., a corporation of New York Application February 19, 1938, Serial No. 191,439

16 Claims. (Cl. 61—72)

This invention relates generally to a submarine cable laying device, and more particularly to a system and apparatus for determining at a point remote from device the tension on, and the angular direction of, the submarine cable at the device during cable laying operations.

Submarine cables when laid on the bed of the ocean or other body of water through which they pass, frequently are fouled or dragged and sometimes are broken by otterboards of nets of deep sea fishing vessels or by ship's anchors, and in the U. S. patent to Lawton and Bloomer, No. 2,067,717, issued January 12, 1937, and the U. S. patent to C. S. Lawton, No. 2,099,527, issued November 16, 1937, there are disclosed various forms of a submarine cable plow adapted to be towed by a cable ship for forming under water a trench in the bed of the body of water in which the cable is to lie and simultaneously placing the cable therein to embed the same and thus avoid fouling of, or injury to, the cable.

It is highly desirable to know on board ship the angular direction of the cable with respect to the horizontal as the cable approaches and enters the plow or other cable laying device, and also the tension on the cable as it passes through the device, to obtain an indication of the angle at which the cable enters the device and the stress on the cable during the cable laying operations, thereby to determine whether the device is being towed at the proper distance behind the ship to receive the cable with a fair lead, and also to enable the stress on the cable applied at the ship to be adjusted to give the best operating conditions at the plow or other device.

One of the objects of the invention is to provide a system and apparatus of the character described which will disclose on board ship or at some other distant point, the angular direction of the submarine cable with respect to the horizontal as the cable approaches and enters the cable laying device.

Another object is a system and apparatus which will disclose on board ship or at some other distant point the tension on the cable as it passes through the cable laying device.

An additional object is the provision of suitable transmission apparatus embodied on the cable laying device for automatically transmitting signals for indicating at a remote point certain conditions of the cable as it approaches and passes through the device, which apparatus will operate equally well in shallow and deep water.

The invention further resides in the features of combination, construction and arrangement hereinafter described and claimed.

For an understanding of the invention, and for illustration of some of the various forms it may take, reference is had to the accompanying drawings, in which:

Fig. 1 is a diagrammatic view of a cable ship and submarine cable plow embodying signal transmitting apparatus in accordance with the invention, during cable laying operations;

Fig. 2 is a schematic diagram of the signal circuit employed in the arrangement of Fig. 1;

Figure 7:
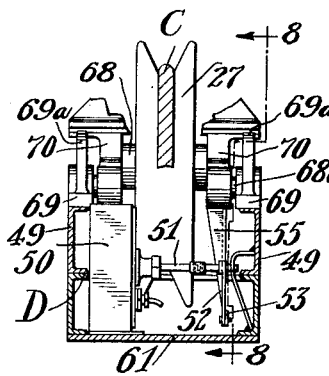
Fig. 7 is a fragmentary view, partly in section, of certain details of one of the transmitters, taken along the line 7—7 of Fig. 3.
Figure 8:
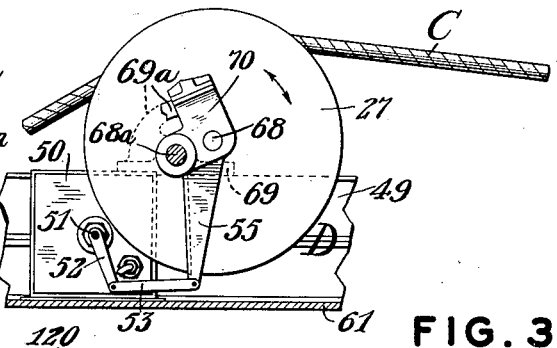
Fig. 8 is a view taken along the line 8—8 of Fig. 7.

Referring to Fig. 1 of the drawings, there is shown a cable embedding device F for forming a cable trench X in the bed of the body of water in which the cable C is to be embedded and simultaneously placing the cable in the trench. As will be seen from the figure, the cable embedding device is towed by a cable ship or vessel V, by means of a towline T, both the cable and towline forming long curves in the water, the amount of sag in the cable and towline varying with the depth of the water in which the embedding device is working. By employing a towline of proper length, the sag in the line causes the latter to exert a pull on the cable embedding device in a direction substantially parallel to the bed on which the embedding device is traveling. Preferably, the degree of curvature in the cable C is maintained such that the cable is approximately tangent to the bed at or near the point where it enters the embedding device, the ideal condition being that the cable enters the embedding device at the point where the cable would naturally be tangent to the bed. The cable is payed out from a cable supply in the hold of the vessel V, and the tensile stress on the cable controlled preferably in the manner disclosed in the aforesaid Lawton and Bloomer Patent No. 2,067,717, the cable passing through a suitable brake device which controls the slack condition of the cable as it passes to the cable payout drum 11. The cable winds around the drum several times and then passes to a roller or sheave 12 on the bow of the ship, after which it is passed along the side of the ship a suitable distance, for example, two-thirds the length of the ship, to a roller or sheave 16 on the side of the cable ship, thereby to minimize the possibility of fouling of the cable C with the towline T. The cable also passes through a dynamometer device 17 which measures the tensile stress on the cable as the latter is payed out. It will be understood that additional rollers or sheaves, not shown, are provided for supporting and guiding the cable on board ship, and also that additional cable sheaves may be provided on the side of the ship, if desired.

The stress on the towline T may be measured and controlled by devices similar to that employed for controlling and measuring the stress on the cable C, and the length of the towline between the bow of the vessel and the cable embedding device F may be adjusted to varying depths of water and conditions of towing in the manner disclosed in the aforesaid Lawton and Bloomer patent.

The cable laying or embedding device may be of any suitable type for example, as disclosed in the Lawton and Bloomer patent, but preferably is in accordance with the improved form of cable plow disclosed in the aforesaid Lawton Patent No. 2,099,527. Briefly, the latter device comprises two frame members or platforms, generally indicated at D and E, respectively, Figs. 3 and 4 herein, operatively connected together by forward and after link arms 18, which coact to cause a plowshare 20, Fig. 4, to form a cable trench X that varies in depth as the ground resistance of the bed varies, thereby to maintain the towing tension within predetermined limits and to cause the cable to be embedded to a greater depth in those areas of the ocean bed comprising soft material than in the areas comprising denser material. Preferably, and as shown, the plowshare has wing members 20a on either side thereof to facilitate displacing the material forming the bed sufficiently to enable the cable to be laid in the bottom of the resulting trench. Rigidly secured to the frame member E are runners or skids 22 by means of which the cable embedding device is slid along on the bottom of the ocean.

Figure 3:
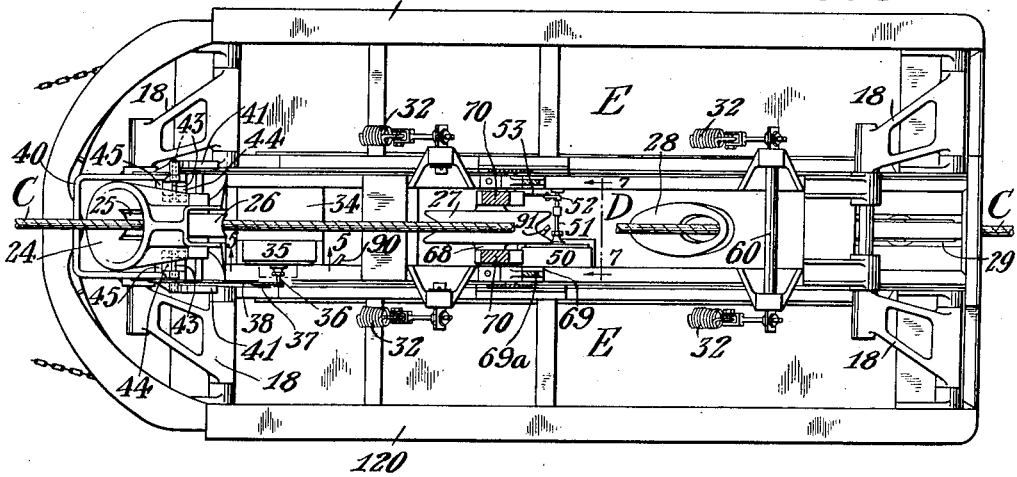
Fig. 3 is a plan view of the submarine cable plow and transmitting apparatus, with certain parts broken away to more clearly disclose other parts thereof.

The frame member D carries a cable guide member 24 which permits the cable C easily to enter the guide and pass between the sheaves or rollers 25 and 26, over the roller 27, and through a trunkway 28, Fig. 3, the cable being forcibly laid in the bottom of the trench X by means of a sheave or cable guide roller 29, the cable passing between two side plates 30 in order that the material displaced by the plow will not slide or be washed back into the trench before the cable is laid therein. As set forth in detail in the aforesaid Lawton patent, the platform D in its lowermost position rests on the platform E, and retractile tension springs 32, operatively connected to the platform, are provided to oppose their separation. The plowshare 20 is rigidly secured to and depends from the platform D which is vertically movable with respect to platform E. When the ground resistance offered to the passage of the plowshare 20 builds up, a couple is created with the towing tension, tending to separate the two platforms D and E vertically. This causes the upper platform D to rise to different heights depending upon the density of the material forming the bed, and this causes a corresponding rise in the plowshare 20 carried by the platform D, thus decreasing the depth of the trench X as the dense material is encountered and causing the trench to vary in depth inversely as the density of the material forming the surface of the bed of the body of water. Resisting the couple thus formed is the weight of the upper platform D and the tension exerted by the springs 32, and by proper design of the spring structure a balance can be obtained at any predetermined maximum towing tension at both extreme positions of the frames.

Figure 4:
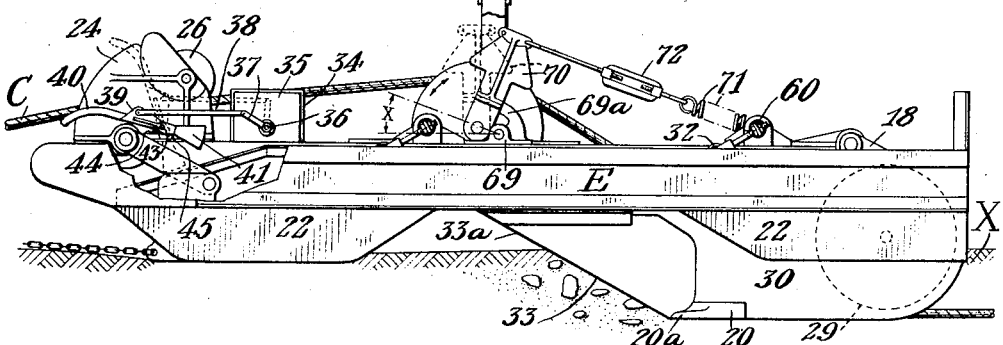
Fig. 4 is a side view, in elevation, of the submarine cable plow and transmitting apparatus.

In order to prevent fouling of the plowshare 20 by obstructions, such as underlying rock formations and the like, which may be encountered in the ocean bed, a web portion 33, Fig. 4, is provided which extends between the plowshare and the platform D, the inclined forward edge 33a of which web engages any such obstruction in advance of the plowshare and causes the latter to be lifted up over the obstruction. After the obstruction has been passed, the device immediately begins again to plow the cable trench and continues with the embedding operation of the cable, and thus operations need not be suspended because of any obstruction encountered. Fixedly secured to a plate 34 of the platform D is a transmitting device 35, which is operable under water and is adapted to transmit signals corresponding to the angular direction of the submarine cable as it approaches the embedding device whereby an indication of the degree of curvature in the cable at this point may be obtained. In this manner it is possible to maintain the lead of the cable such that the cable is approximately tangent to the ocean bed at the point where it enters the device F, and the amount of cable between the ship and plow may be maintained such that an excess of cable will not accumulate ahead of the plow.

The transmitter is operated by a rotatable shaft 36, Figs. 3 and 4, the rotation of the shaft being controlled by link members 37 and 38, the member 37 being keyed at one end to the shaft 36, and at its other end is pivotally connected to the link 38. Link 38 is pivotally connected to an ear 39 extending from the U-shaped cable feeler 40. The ends of the cable feeler are keyed to rotatable pins 43, which pins are rotatably mounted in lugs 44 secured to a plate 45 comprising a part of the platform D. Counterweights 41 are keyed to the pins 43 and urge the feeler 40 into engagement with the underside of the cable C slightly in advance of the place where the cable enters the forward guide 24. When the degree of curvature of the cable increases, this causes further depression of the cable feeler 40, and this causes corresponding rotation of the transmitter shaft 36, in a counterclockwise direction as viewed in Fig. 4. When the degree of curvature of the cable C decreases, the cable will rise and the feeler 40 follows the cable so that the feeler turns in a clockwise direction to assume a position such, for example, as is indicated in dotted outline in Fig. 4, this movement of the cable feeler and associated link structure 37, 38 causing the transmitter shaft 36 to be rotated in a clockwise direction. Signals are transmitted, in a manner hereinafter set forth in detail, by the transmitter 35 for indicating at any instant the position of the shaft 36 and feeler 40, and also the extent of movement of these members as the curvature or sag of the cable varies.

The stress on the cable, as it passes through the embedding device F, is determined as follows:

Referring to Figs. 3, 4, 7 and 8, there are shown a dynamometer sheave 27 rotatably mounted on an offset shaft 68, the ends 68a of which are mounted in bearings 69 secured to the channel members 49 of the frame D. Integrally secured to the shaft 68 of the sheave assembly is a guard structure 70 which is urged in a clockwise direction as seen in Fig. 4 by a contractile spring 71 secured at one end to the guard structure 70 and at its opposite end to a shaft 60 carried by the frame D. A turnbuckle 72 is provided to adjust the tension exerted by the spring. The extent of movement of the guard 70 due to the influence of the spring 71 is limited by stops 69a secured to the bearing 69. When the cable is under tension, as during plowing and embedding operations, the tension on the cable rotates the sheave assembly, in a counter-clockwise direction as viewed in Fig. 4, or in a clockwise direction as viewed in Fig. 8, to different positions through the angle X, Fig. 4, against the action of the spring 71, as for example, to the position indicated in dotted outline in Fig. 4, in accordance with the tension on the cable. This angular movement of the sheave assembly gives an indication of the amount of tension on the cable at any instant and enables the production and transmission of electrical signals for the purpose of disclosing on board ship the tension on the cable, as by means of a transmitter 50 which is secured to the frame member 61 of the platform D, the transmitter being operatively connected by means of a rotatable shaft 51 to the rotatable sheave assembly. The rotation of the shaft 51 is controlled by the movement of pivotally connected link members 52 and 53, the member 52 being keyed at one end to the shaft 51 and pivotally connected at its other end to the member 53, the latter member being pivotally connected to an arm 55 which is integral with one of the guard members 70. Rotation of the sheave assembly, in a clockwise direction as viewed in Fig. 8, or in a counter-clockwise direction as viewed in Fig. 4, causes rotation of the shaft 51 in a corresponding direction and to an extent proportional to the extent of movement of the sheave assembly. Conversely, the return movement of the sheave assembly rotates the shaft 51 in the opposite direction, the position of the shaft 51 always corresponding to the position of the sheave assembly. Signals are transmitted, in the manner stated hereinafter, by the transmitter 50 for indicating at any instant the position of the sheave assembly, and also the extent of movement thereof, thereby to indicate the stress on the cable as it passes through the embedding device.

In the embodiment illustrated herein, the electrical signals produced by the devices 35 and 50 are transmitted, by means of a signal or messenger cable M, Fig. 1, to the cable ship, the ship having receiving apparatus thereon responsive to such signals for indicating and recording the angle at which the cable enters the embedding device, and the stress or tension on the cable as it passes through the device during the entire plowing operation.

Figure 5:
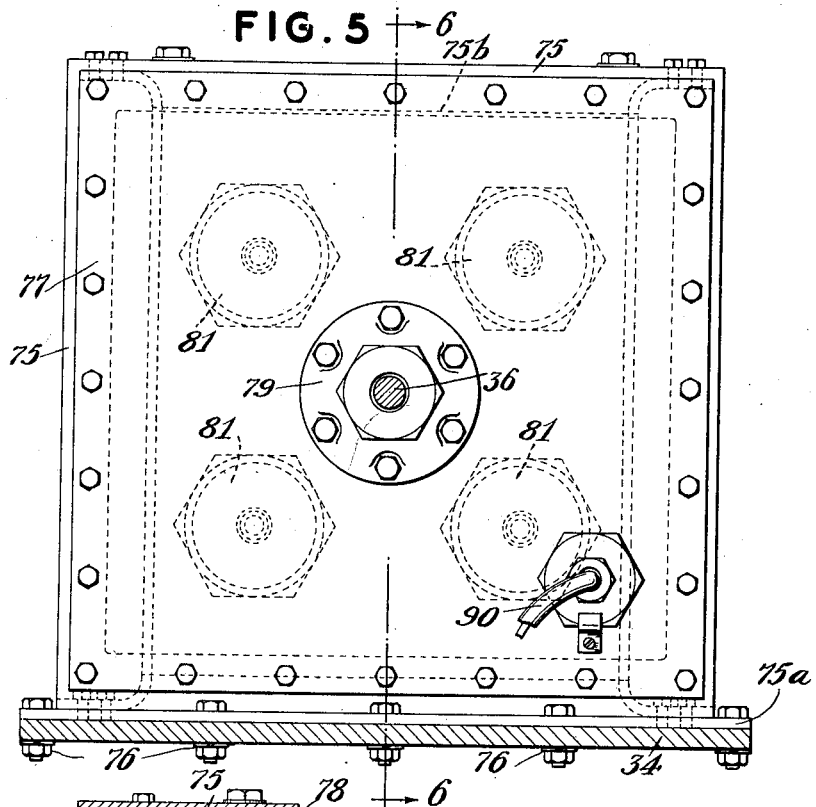
Fig. 5 is a view of one of the transmitters, looking along the line 5—5 of Fig. 3.
Figure 6:
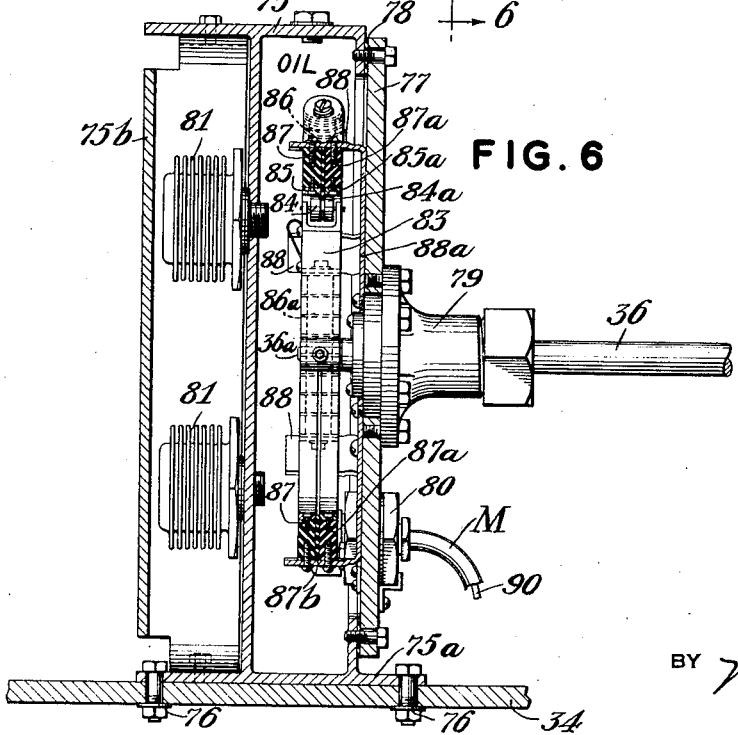
Fig. 6 is a sectional view taken along the line 6—6 of Fig. 5.

Figs. 5 and 6 illustrate various details of a preferred form of transmitting device which may represent either of the devices 35 and 50, although it will be understood that any other form of transmitting device suitable for the purpose may be employed. In the embodiment illustrated, the transmitter is enclosed in a casing 75 which is filled with an insulating oil, preferably castor oil of low acid content. The casing has a lower flanged portion 75a for receiving bolts 76 by means of which the transmitter casing is secured to the platform D of the embedding device. The casing is also provided with a detachable cover plate 77 on the casing, a gasket 78 of vulcanized rubber or other suitable material being provided to prevent escape of the oil from the casing.

Because of the enormous hydrostatic pressures encountered in deep sea operations, the casing for each transmitter must be able to withstand very high pressures. The use of a very heavy container having the proper configuration, for example, cylindrical or spherical, does not provide a practical solution where a shaft 36, or a cable or conductor, such as the signal cable M, enters the casing, since the hydrostatic pressure of the water tends to cause the casing to leak at the glands and packing in the stuffing boxes 79 and 80 around the shaft and conductor. Furthermore, the use of a very heavy casing is undesirable because of the considerable additional weight of such casings, and also because the configuration of such casings usually results in considerable lost space between the enclosed apparatus and the casing.

In the form of casing illustrated herein, however, four metal bellows members 81 are employed, these members having their inner open ends screwed into the body of the casing 75 from the outside, the outer bellows portions projecting from a side of the casing, as shown in Fig. 6. The bellows are protected by a false side 75b of steel plate, the plate being fitted to the container with sufficient clearance to permit the water to reach the bellows. The casing and bellows are filled with the castor oil above mentioned, and as the hydrostatic pressure of the water is applied to the bellows the latter are compressed to an extent such that the pressure on the oil within the casing, due to the compression of the bellows, increases until it substantially equalizes the hydrostatic pressure of the water. In a submarine device such as illustrated herein, the bellows are so constructed that at a depth of 500 fathoms in sea water all bellows members will be compressed about three-quarters of the maximum permissible amount. When filling the casing with oil, it is necessary to take precautions against leaving air pockets. By means of this equalization of pressure within and without the casing, the latter may be made of relatively thin, lightweight material, and may have any desired configuration, this feature comprising the subject-matter of a separate invention described and claimed in my copending application for "Submarine apparatus", Serial No. 189,972, filed February 11, 1938.

A reduced portion 36a of the shaft 36 extends through the plate 77, and bolted thereto is the inner end of a rheostat arm 83, the arm carrying at its outer end phosphor-bronze spring-pressed rollers 84 and 84a adapted to travel over and electrically contact two rows of conducting segments 85 and 85a, respectively, for connecting in circuit various sections of several series connected, tapped, resistance coils, two of which are indicated at 86 and 86a. The rheostat segments are secured to the inner surfaces of two annular rings 87 and 87a of Bakelite or other suitable insulating material, these rings being clamped together with an insulating separator ring 87b, the separator ring insuring proper spacing between the two rows of contacts 85 and 85a. The resistance coils are secured by brackets 88 to the outer surfaces of the annular rings, and the rings are supported by a spider framework 88a secured to the plate 77. By means of this construction all working parts other than the bellows are supported by the cover plate 77, and this maintains correct tracking of the rollers 84 and 84a of the rheostat arm on the rows of contacts at all times, and also facilitates inspection and repair of the various parts.

Any turning movement of the shaft 36 causes a corresponding movement of the rheostat arm 83 and the rollers 84 and 84a over the contact segments 85 and 85a, and thus the resistance of the rheostat is varied and electrical impulses are introduced into the signal circuit 90, Fig. 2, for transmitting to the vessel V electrical signals corresponding to the angle at which the cable enters the embedding device, which signals produce on board ship movements of an associated recording or indicating instrument, such as a recording milliammeter 95, the milliammeter indicating and also producing a record of the successive angles at which the cable enters the embedding device. Similarly, any turning movement of the shaft 51 of transmitter 50, which may be identical in construction to transmitter 35, causes electrical impulses to be introduced into the signal circuit 91 for transmitting to the vessel V electrical signals corresponding to the varying tension on the cable as it passes through the embedding device, and these signals operate a recording milliammeter 96 to indicate and produce a record of the tension on the cable.

In the devices disclosed herein the particular design of the transmitter rheostat shown was chosen for the following reasons. It was desirable that the rheostat shafts each register one and one-half degree angular movement in the region of the midpoint position, shown on Fig. 2, and a stud type rheostat was desirable. The radius of the arc of contact had to be large for one and one-half degree studs to be practicable; on the other hand, a large radius involves a high friction torque, a large heavy pendulum and a large casing. Step-up gearing between the rheostat arm and its actuating shaft was impracticable because of the effect which even a slight back-lash and friction would have on the accuracy of the device. Since the normal pressure at the contact surfaces was to reach 1300 pounds per square inch, the coefficient of friction had to be as small as possible so that the desired accuracy could be obtained with a reasonable size of pendulum. In the rheostat herein disclosed, the contact is made by the rollers 84 and 84a which move over the two rows of segments 85 and 85a. The smallest segments of each row (which are on each side of the midpoint position as shown in Fig. 2) subtend an angle of three degrees at the shaft axis, and one row of segments is displaced with respect to the other. The rollers 84 and 84a alternately make contact with the segments of the two rows, and the effect is that of segments on one and one-half degree centers while the radius of the contact circle is only approximately four inches in the embodiment illustrated. Preferably, each of the two transmitters is arranged to give readings in steps of one and one-half degrees for fifteen degrees movement on either side of the midpoint position, but beyond this the rheostat segments and the corresponding milliammeter deflections are enlarged.

The two signaling circuits 90 and 91, shown diagrammatically on Fig. 2, are supplied from a 110 volt battery or other source of direct current 92 on board ship, one side of the battery being grounded to the ship's hull, and the other side connected to each signaling circuit through a fuse 93, and a ballast resistance 94 to the recording milliammeters 95 and 96. From the milliammeters the circuits continue through the conductors 90 and 91 and signal cable M, shown in Fig. 1, and at the plow the signal cable is secured in any suitable manner to the plow structure, and the cable leads or conductors 90 and 91 are caused to enter their respective transmitting devices through suitable stuffing boxes 80 in the cover 77 of the transmitter casing. The conductor 90 or 91 of the signal circuit is connected, as shown in Fig. 2 to one end of the series connected resistance coils, and thence through the various sections of the resistance coils to the rheostat segments 85 and 85a, Fig. 6. The return circuits are through the spring pressed rollers 84 and 84a, rheostat arm 83, and thence to the casing 75, the circuit being completed through the water to the vessel V to which the battery 92 is grounded.

The ballast resistances 94, Fig. 2, on board the vessel preferably are of the tubular type and are continuously variable from zero to 276 ohms, these resistances being provided to adjust the milliammeter deflection at the commencement of an operation and subsequently protecting the milliammeter in the event of a cable fault. The deflection adjustment should be made when the associated transmitter on the plow is in a known position, for instance, with the rheostat arm 83 in the zero or midpoint position, to bring the milliammeter pointer to the corresponding midpoint scale position. Once set, the ballast resistance should remain unchanged until the length of messenger cable M in the signal circuit is changed. In the specific circuit disclosed in Fig. 2 of the drawings, the resistance in each circuit between the ship's ground and the plow, including the resistance of the messenger cable but excluding the plow instrument, will be approximately 229 ohms. Since the messenger cable shown has a resistance of approximately 49 ohms per mile, there will be between 130 and 230 ohms in each of the ballast resistances, depending on the length of messenger cable in use.

The recording milliammeters are of a type well known in the art, and therefore are not described here in detail. The useful part of the chart on each recording milliammeter may be 3¾ inches wide, and is divided into 50 parts each representing 10 milliamperes of current. The divisions are progressively smaller from the zero-current end of the scale to the maximum-current end, but the departure from linearity is slight. Both indicator circuits have been so designed that the current will not fall below 20 milliamperes or rise above 480 milliamperes, unless a fault occurs in the messenger cable or elsewhere.

It is essential that the supply voltage 92 be maintained within a small margin on either side of 110 volts. The effect of a change of voltage on the milliammeter deflection varies with the deflection itself, and the apparatus has been so designed that the greatest effect occurs in lesser-used parts of the scale or where the degree of accuracy required is lowest.

In order to prevent fouling of the cable M by the plow or the cable C or towline T, buoy devices B are provided, as shown in Fig. 1, the buoy devices being connected to the cable at points so spaced from the cable laying device as to prevent fouling. Because of the enormous hydrostatic pressures encountered, it was found impracticable to build single large buoys which would withstand the pressures and yet retain a reasonable margin of buoyancy, and therefore, each buoy device preferably comprises a plurality of small buoys or hollow steel balls, and these buoys are enclosed in a container of canvas or other suitable material, the stress on the container being carried by a rope which surrounds and is sewn to the container. The rope also provides a means for securing the buoy device to the messenger cable, as by stoppers 113 secured to the cable in the manner shown in the drawings. Even when relatively small balls were used as buoys, nevertheless it was found that these balls were likely to collapse in the event of a dent made in them by adjacent balls, and therefore the individual buoys are separated by shock absorbing means of felt or other suitable material. With the buoy device shown, eddy resistance and consequent vibrational stresses are reduced to a minimum and are not substantially greater than that encountered with a single ball.

The cable embedding device F may be lowered onto the bed of the ocean or other body of water by the lowering attachment 118, Fig. 4, and any suitable form of lowering line, such as shown in the aforesaid Lawton and Bloomer Patent No. 2,067,717, or the Lawton Patent No. 2,099,527, may be used. Because of the disposition of the center of gravity which is kept low in the device F and because of the substantial breadth of the device and the side plate members 120, Fig. 3, the device will not turn over even though canted through a large angle with respect to the horizontal, and if the device should be canted onto its side its configuration and its low center of gravity tend to cause it to return to its working position. The device is especially adapted for embedding a submarine cable in deep water and at considerable distances from shore, and may be lowered into working position out at sea in such areas. The various mechanical elements of the apparatus disclosed preferably are made from material resistant to the corrosive action of salt water.

It will be noted that the cable feeler 40, Figs. 3 and 4, is so mounted as to engage the under side of the cable C, instead of bearing on the top of the cable. The reason for this is that during the forward movement of the embedding device, the force of the water would, if the feeler 40 were on the top of the cable, tend to force the feeler upwards and away from the cable and thus prevent the feeler from giving a true indication of the angle at which the cable enters the device, whereas in the arrangement shown the force of the water assists in holding the feeler in contact with the cable.

By means of the cable tension indicating apparatus shown, the lead of the cable may be maintained within suitable limits, and thus prevent fouling by reason of an accumulation of cable ahead of the plow or deflection of the cable by lateral currents.

In the specific embodiment illustrated, the device F, on which the transmitting units 35 and 50 are mounted, is employed for embedding a submarine cable, but the invention is not limited to such a device since the transmitting apparatus disclosed can be used equally well with other devices which may be slid or otherwise caused to travel along on the bed of the ocean or other body of water for indicating at a remote point the lead of a cable or line as it approaches such devices and the tension on the cable or line at the devices, and for obtaining a record of this information.

Many other and varied forms and uses will readily suggest themselves to those versed in the art without departing from the invention, and the invention is, therefore, not limited except as indicated by the scope of the appended claims.

I claim:

1. Submarine apparatus comprising a device and means for causing the device to travel along on the bed of the ocean or other body of water, means for passing a cable through said device, said device having means operable under the water for transmitting signals in accordance with the tension exerted on the cable as it passes through the device, and receiving means located at a distance from the transmitting means and responsive to said signals to indicate the tension on the cable at the device.

2. Submarine apparatus comprising a device and means for causing the device to travel along on the bed of the ocean or other body of water, means for passing a cable through said device as it travels along, said device having means engaging the cable and operable under the water for transmitting signals respectively corresponding to the varying degrees of tension exerted on the cable as it passes through the device, and receiving means located at a distance from the transmitting means and responsive to said signals to indicate the varying degrees of tension thus exerted on the cable.

3. Submarine apparatus comprising a device and means for causing the device to travel along on the bed of the ocean or other body of water, means for passing a cable through said device as it travels along, said device having means operable under the water for transmitting an electric signal corresponding to the degree of tension exerted on the cable at any instant as it passes through the device during its travel along on said bed, and receiving means located at a distance from the transmitting means and responsive to the signal transmitted for indicating at any instant the tension on the cable at said device.

4. Submarine apparatus comprising a device and means for causing the device to travel along on the bed of the ocean or other body of water, means for passing a cable through said device as it travels along, said device having a cable guide member movable to different positions in accordance with the tension exerted on the cable as it passes through the device, and means controlled by said cable guide element for indicating the varying degrees of tension exerted on the cable as it passes through the device.

5. Submarine apparatus comprising a device and means for causing the device to travel along on the bed of the ocean or other body of water, means for passing a cable through said device as it travels along, said device having a cable guide member movable to different positions in accordance with the tension exerted on the cable as it passes through the device, means constantly urging said cable guide member into contact with the cable, and means controlled by cable guide element for transmitting signals in accordance with the tension exerted on the cable.

6. Submarine apparatus comprising a device and means for causing the device to travel along on the bed of the ocean or other body of water, means for passing a cable through said device as it travels along, a rotatable member engaging said cable, mounting means for said rotatable member movable to different positions thereby in accordance with the tension on the cable as it passes through the device, and means controlled by said movable mounting means for transmitting electrical signals in accordance with the tension exerted on the cable.

7. Submarine apparatus comprising a device for traveling along on the bed of the ocean or other body of water, means including a vessel for towing said device along on said bed and for paying out a cable to cause the latter to pass through said device as it travels along, means on said device operable under the water for transmitting signals in accordance with the tension exerted on the cable as it passes through the device, and receiving means on the vessel responsive to the signals transmitted to indicate at any instant the tension on the cable at said device.

8. Submarine apparatus comprising a device for traveling along on the bed of the ocean or other body of water, means for towing said device along on said bed and for passing a cable through said device as it travels along, said device having means operable under the water for transmitting signals indicative of the angle at which the cable approaches the device, and receiving means located at a distance and responsive to the signals transmitted to indicate the lead of the cable with respect to said device.

9. Submarine apparatus comprising a device for traveling along on the bed of the ocean or other body of water, means for towing said device along on said bed and for paying out a cable to said device as it travels along, said device having means operable under the water for transmitting electrical signals indicative of the angle which the cable assumes with respect to the horizontal as it approaches the device, and receiving means located at a distance from said device and responsive to the signals transmitted to indicate the angle which the cable assumes with respect to the horizontal as it approaches the device.

10. Submarine apparatus comprising a device for traveling along on the bed of the ocean or other body of water, means for towing said device along on said bed and for passing a cable through said device as it travels along, said device having a feeler member engaging said cable at the place where the cable enters the device, and means controlled by said feeler member for transmitting signals indicative of the angle at which the cable approaches the device.

11. Submarine cable laying apparatus comprising a device for traveling along on the bed of the ocean or other body of water in which a cable is to lie, means including a vessel for towing said device as the latter travels along on the bed, means on the vessel for paying out the cable and for applying varying degrees of stress on the cable as it is payed out, and means for determining the necessary degree of stress to be applied to the cable as it is payed out to enable said device to receive the cable with a suitable lead, said last named means comprising an element on said device engaging the cable at the place where it enters the device and means controlled by said last named means for transmitting signals indicative of the angle of the cable as it approaches the device, and receiving means on the vessel responsive to the signals transmitted to indicate the lead of the cable with respect to said device.

12. Submarine cable laying apparatus comprising a device for traveling along on the bed of the ocean or other body of water in which a cable is to lie, means including a vessel for towing said device as the latter travels along on the bed, means on the vessel for paying out the cable and for applying varying degrees of stress on the cable as it is payed out, and means for determining the necessary degree of stress to be applied to the cable as it is payed out to enable said device to receive the cable with a suitable lead, said last named means comprising an element on said device engaging the under side of the cable at the place where it enters the device and means controlled by said last named means for transmitting signals indicative of the angle of the cable as it approaches the device, and receiving means on the vessel responsive to the signals transmitted to indicate the lead of the cable with respect to said device.

13. Submarine apparatus comprising a device and means for causing the device to travel along on the bed of the ocean or other body of water, means for passing a cable through said device as the latter travels along on said bed, and means for indicating the angle at which the cable approaches the device and the tension exerted on the cable as it passes through the device.

14. A submarine cable embedding device having supporting means for engaging and traveling along on the bed of the body of water in which the cable is to lie, said device having means for forming a cable trench in the bed, means for causing the device to travel along on said bed, means for simultaneously passing a cable through the device, said device having means for placing the cable in the trench, and means on said device for transmitting to a distant point electrical signals corresponding to the tension exerted on the cable as it is placed in the trench.

15. A submarine cable embedding device having supporting means for engaging and traveling along on the bed of the body of water in which the cable is to lie, said device having means for forming a cable trench in the bed, means including a vessel and a towline connected to said device for causing the device to travel along on said bed, means for simultaneously passing a cable through the device, said device having means for placing the cable in the trench, and means on said device for transmitting to said vessel electrical signals corresponding to the successive angular positions assumed by the cable with respect to the horizontal as the cable approaches the device during the cable embedding operation.

16. A submarine cable laying device having supporting means for engaging and traveling along on the bed of the body of water in which the cable is to lie, means including a vessel and a towline connected to said device for causing the device to travel along on said bed, means for simultaneously passing a cable through the device, means on said device for transmitting electrical signals to indicate the angle at which the cable approaches the device and the tension on the cable as it passes through the device during the cable laying operation, receiving means on the vessel responsive to said signals, and a signal cable extending between the transmitting and receiving means.

CHESTER S. LAWTON.